United States Patent [19]

Tucker

[11] Patent Number: 5,262,447
[45] Date of Patent: Nov. 16, 1993

[54] COMPOSITES HAVING A DIMENSIONALLY STABLE WATER-BLOWN POLYURETHANE FOAM BY EMPLOYING LITHIUM SALTS FOR COOLING CONTAINERS

[75] Inventor: John R. Tucker, Wyandotte, Mich.

[73] Assignee: BASF Corporation, Parsippany, N.J.

[21] Appl. No.: 997,006

[22] Filed: Dec. 28, 1992

[51] Int. Cl.⁵ .............................................. C08G 18/14
[52] U.S. Cl. .................... 521/125; 427/373; 428/318.4; 428/319.1; 428/319.3; 428/319.7; 428/319.9
[58] Field of Search ............... 521/125; 427/373; 428/318.4, 319.1, 319.3, 319.7, 319.9

[56] References Cited

U.S. PATENT DOCUMENTS

| | | | |
|---|---|---|---|
| 3,426,110 | 2/1969 | Kesling | 528/44 |
| 4,110,270 | 8/1978 | Narayan | 528/83 |
| 4,190,305 | 2/1980 | Knight et al. | 528/76 |
| 4,240,999 | 12/1980 | Decker, Jr. | 528/83 |
| 4,704,410 | 11/1987 | Booth et al. | 528/85 |
| 4,721,237 | 1/1988 | Leslie | 528/48 |

FOREIGN PATENT DOCUMENTS

WO91/15366 10/1991 PCT Int'l Appl. .

OTHER PUBLICATIONS

07/850,542, filed Mar. 13, 1992.
07/990,405, filed Dec. 14, 1992.

*Primary Examiner*—Maurice J. Welsh
*Attorney, Agent, or Firm*—Dennis V. Carmen

[57] ABSTRACT

A water-blown polyurethane foam is provided between two substrates in foamed-in-place applications such as cooling containers. The water-blown polyurethane foam is made dimensionally stable at low densities by adding lithium salts of a 2 to 24 carbon atom carboxylic acid to the polyol component. The dimensional stability of the foam at the low densities further results in raw material savings.

20 Claims, No Drawings

5,262,447

COMPOSITES HAVING A DIMENSIONALLY STABLE WATER-BLOWN POLYURETHANE FOAM BY EMPLOYING LITHIUM SALTS FOR COOLING CONTAINERS

FIELD OF THE INVENTION

The present invention relates to rigid polyurethane foams, more particularly to dimensionally stable, water-blown, rigid polyurethane foams formed between two substrates for cooling container or insulation applications.

BACKGROUND OF THE INVENTION

In the manufacture of refrigeration cabinets, picnic coolers, doors, and other insulated containers, polyurethane foam is poured in placed between two substrates defining a cavity. In the method of preparing refrigeration or cooler containers, an inner plastic liner is placed into an outer optionally metal cabinet in a fixed, nested, spaced relationship, forming a cavity into which polyurethane foam is poured. Once the polyurethane foam is poured into the cavity, the container is held in its fixed position until the foam cures to prevent delamination of the foam from the sides of the container.

There are several requirements that a polyurethane foam should meet in pour in place foaming applications. One requirement is that an alternative blowing agent to ozone depleting CFCs must be found. A second requirement is that the polyurethane foam should flow well so that the entire cavity is filled with the foam. If the foam prematurely gels, voids will form behind the prematurely gelled foam where the foaming mass could not reach. A third requirement is to use the least amount of raw foaming material to fill a particular cavity to save on raw material costs. To adequately fill all portions of the cavity and prevent the presence of voids, it is often necessary to overpack the cavity. The less overpacking that is necessary to completely fill the mold, however, the greater the savings in raw material costs. Thus, it is desired to form a polyurethane-filled container having the lowest density possible.

Many polyurethane foam manufacturers are now turning to water as the sole source of blowing agent instead of CFCs or HCFCs. In the field of cooling containers where the foam is poured in place, water-blown rigid polyurethane foams present a unique problem. Rigid polyurethane foams blown with water tend to be closed-celled foams which shrink and pucker almost immediately after foaming and during cure. This is partly due to the migration of carbon dioxide gas, produced by the water reaction with polyisocyanate, out of the closed cells and leaving behind a vacuum which then tightens and shrinks the foamed mass. A foam which shrinks in foamed-in-place applications will either pull away from the surface of the substrates, reducing adhesion and resulting in blistering, or continue to adhere to the inner surface of the substrates causing saviness and surface deformities on the substrate. The problem of foam shrinkage in CFC-blown foams was not as acute since CFC gases tended to migrate out of the closed cells very slowly over a period of months or years, if at all, which enabled ambient gases to diffuse inward and equalize the pressure.

The problem of foam shrinkage or dimensional stability is more severe in picnic cooler applications where the coolers are often subject to wide temperature variations, from indoor 70°-80° F. temperatures to beach temperatures in direct sun which may climb to 110°-120° F., causing the gas in the cells to further expand and diffuse out.

It is also desired to produce a foam having a lower density yet which fully fills the cavity and is dimensionally stable to lower raw material costs. Lowering the density, however, especially in water-blown foam already having a tendency to shrink has the attendant disadvantage of further exacerbating the dimensional instability of the foam.

SUMMARY OF THE INVENTION

It is an object of the invention to provide a pour in place water-blown polyurethane foam which is dimensionally stable. It is a further object of the invention to provide a pour in place water-blown polyurethane foam which is dimensionally stable even at low densities.

These objects have been met by adding a lithium salt of an organic carboxylic acid having 2 to 24 substituted or unsubstituted, aliphatic or cycloaliphatic, alkyl or alkenyl carbon atoms to a polyol component and reacting the polyol component with an aromatic organic polyisocyanate in situ between two substrates.

One feature of the invention is a water-blown, foamed-in-place polyurethane foam sandwiched between two substrates, which foam is open-celled in the free rise state. Another feature of the invention is a water-blown, foamed-in-place polyurethane foam which has a low density. The advantage of the foamed-in-place, water-blown polyurethane foam of the invention is that it is dimensionally stable with little or no shrinkage under thermal cycling, thereby maintaining its adhesion with the surfaces of the substrates and avoiding surface indentations in the substrates. Another advantage is that dimensional stability is maintained, even at low densities, reducing raw material costs without sacrificing performance.

DETAILED DESCRIPTION OF THE INVENTION

The invention comprises in laminated sequence a first substrate, a polyurethane foam, and a second substrate. The first and second substrate may be made of the same material or a different materials, depending upon the application. Suitable substrate materials comprise metal such as aluminum or sheet metal; wood, including composite wood, acrylonitrile-butadiene-styrene (ABS) triblock of rubber, optionally modified with styrene-butadiene diblock, styrene-ethylene/butylene-styrene triblock, optionally functionalized with maleic anhydride and/or maleic acid; polyethylene terephthalate, polycarbonate, polyacetals, rubber modified high impact polystyrene (HIPS), blends of HIPS with polyphenylene oxide; copolymers of ethylene and vinyl acetate, ethylene and acrylic acid, ethylene and vinyl alcohol; homopolymers or copolymers of ethylene and propylene such as polypropylene, high density polyethylene, high molecular weight high density polyethylene, polyvinyl chloride, nylon 66, or amorphous thermoplastic polyesters. Preferred are ABS, HIPS, polyethylene, and high density polyethylene.

The polyurethane foam may be contiguous to and bonded to the inner surfaces of the first and second substrates, or the polyurethane foam may be contiguous to a layer or lamina of synthetic material interposed between the substrates. Thus, the sequence of layers in the composite may also comprise a first substrate/polyurethane foam/layer or lamina/second substrate or first substrate/layer or lamina/polyurethane foam/layer or lamina/second substrate.

The layer or lamina of layers additionally interposed into the composite may comprise any one of the above-mentioned synthetic resins which have good elongation such as low density polyethylene or low density linear polyethylene as a stress relief layer or a material which promotes adhesion between the polyurethane foam and the and the first and/or second substrate of choice.

When a synthetic plastic material such as polyethylene having few or no bonding or adhesion sites is chosen as the first and/or second substrate as an alternative to an adhesion-promoting layer, it is useful to first modify the substrate surface with a corona discharge or with a foam treatment to improve adhesion to the polyurethane foam.

During the foam-in-place operation, the substrates are fixed apart in a spaced relationship to define a cavity between the first substrate and second substrate, optionally at the inner surface of at least one of which is treated to promote adhesion. This cavity is then filled with a liquid polyurethane system which reacts and foams in situ, bonding to the inner surfaces of the first and second substrates. In the case of a cooler container, such as a picnic cooler, a thermoformed inner liner material is inserted into the outer shell of the cooler, optionally also thermoformed, in a nested spaced relationship defining a cavity, which cavity is then filled with a foamed-in-place polyurethane foam. In many cases, it is only the polyurethane foam which holds together the outer shell and inner liner, underscoring the need for foam dimensional stability.

The polyurethane foam of the invention comprises the reaction product of an aromatic polyisocyanate with a polyol component. The polyurethane foam is rigid, meaning that the ratio of tensile strength to compressive strength is high, on the order of 0.5 to 1 or greater, and has less than 10 percent elongation. The polyurethane foam of the invention in the free rise state has a high open-cell content, while in a molded or foamed-in-place state, it is a closed-celled foam having dimensional stability even at low densities. Typical water-blown foams in the free rise state will pucker and shrivel while the water-blown foams containing lithium salts according to the invention will produce a foam at equivalent densities having good dimensional stability which does not visibly shrink at ambient temperatures. The free rise foams according to the invention have a much improved cell structure and have a large number of open cells. The foam's open-cell content will vary according to the amount of lithium salt employed but will typically have an open-cell content of more than 40 percent, preferably more than 55 percent, more preferably more than 70 percent. When the foam of the invention is shot, poured, or injected into the cavity, the cells of the foam remain closed; yet, the foam continues to display good dimensional stability. A water-blown foam packed at equivalent densities will shrink and delaminate from the substrate surfaces making it necessary to greatly overpack the cavity to obtain the desired dimensional stability. Greatly overpacking the cavity, however, requires more raw material per part, increasing costs. In many water-blown foams, the mold must be overpacked by about 20 percent to 25 percent to achieve some semblance of stability; whereas, when the lithium salts according to the invention are used in the formulation, the mold need be overpacked by only about 5 percent to 10 percent to achieve good stability, which is the current packing level used in CFC-blown foams. This results in raw material cost savings and lighter weight parts.

The packed polyurethane foam of the invention remains as a closed-celled foam having good dimensional stability at overpacking levels of 5 percent to 10 percent. By a "packed" foam is meant the foam in its foamed-in-place state. The overpacking levels are determined by the ratio of the actual quantity of foam in the cavity to the minimum quantity reuqired to fill the cavity. The closed-celled content of the packed foam is about 70 percent or more uncorrected, typically around 80 percent or more uncorrected. The foams remain dimensionally stable even at packed overall densities less than 2.5 pcf, preferably less than about 2.3 pcf, or packed core densities of less than 2.3 pcf, preferably less than 2.2 pcf.

The water-blown polyurethane foams containing lithium salts have the characteristic of being dimensionally stable; that is, the percent change in volume of a $3''\times 3''\times 1''$ sample taken from a foamed-in-place foam is 20 percent or less, preferably less than 15 percent or less, most preferably 10 percent or less, at 100° F. and 100 percent relative humidity after 28 days; and 5 percent or less, preferably 3 percent or less, more preferably 2 percent or less, at cold temperatures of $-20°$ F. dry after 14 days; as measured according to ASTM D-2126. Although the cells remain substantially closed in the foamed-in-place foam, as is typical in molded water-blown polyurethane foams, it nevertheless is resistant to shrinkage, which is the overriding concern in foamed-in-place foams, especially for cooler containers. This dimensional stability is due to the presence of the lithium salts in the formulations. In water-blown, foamed-in-place foams without lithium salts, however, the percent variation in foam volume at 100° F. and 100 percent relative humidity after 28 days is a conservative 30 percent and is often 40 percent.

In the preparation of the polyurethane foams of the invention, the isocyanate is reacted with the active hydrogen-containing compounds in an isocyanate to active hydrogen ratio of from 0.5:1 to 10:1. The index of the composition is defined as the —NCO/active hydrogen ratio multiplied by 100. In the present invention, the index ranges from 90 to 300, preferably 95 to 130. In calculating the number of active hydrogens present, all of the active hydrogen-containing compounds other than non-dissolving solids are taken into account, including the polyols, chain extenders, water, functional plasticizers, etc.

The polyol component of the polyurethane foam comprises compounds having at least two isocyanate reactive hydrogens, a blowing agent, the lithium salts, and optionally a catalyst(s), chain extender, surfactant, and flame retardant.

As the compound having at least two isocyanate reactive hydrogens, there can be mentioned polyoxyalkylene polyether polyols, polyoxyalkylene polyester polyols, and graft polyols; polyhydric polythioethers; polyhydroxy-containing phosphorous compounds; polyacetals; aliphatic thiols and mixtures thereof. These compounds having at least two isocyanate reactive hydrogens have of about 2.5 to 8, preferably about 3 to 8, a theoretical hydroxyl number of about 40 to about 700, and an average molecular weight ranging from about 150 to about 6000, preferably 300 to about 3500. More than one type of compound having at least two isocyanate reactive hydrogens may be present as a mixture. The individual types of compounds may have hydroxyl numbers, molecular weights, and functionalities which deviate from the aforementioned ranges so long as the mixture, or the average values of the combined types of compounds, are within the stated ranges.

Suitable hydroxy-terminated polyesters include those, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexane-dicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

Suitable polyoxyalkylene polyether polyol may be used such as the polymerization product of an alkylene oxide with a polyhydric alcohol. Suitable polyhydric alcohols include those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyalkylene polyether polyols may be prepared by any known process such as, for example, the process disclosed by Wurtz in 1859 and Encyclopedia of Chemical Technology, Vol. 7, pp. 257-262, published by Interscience Publishers, Inc. (1951) or in U.S. Pat. No. 1,922,459. Polyethers which are preferred include the alkylene oxide addition products of trimethylolpropane, glycerine, sucrose, sorbitol, propylene glycol, dipropylene glycol, pentaerythritol, and 2,2-bis(4-hydroxyphenyl)-propane and blends thereof having molecular weights of from 300 to 3500.

Suitable amines which may be condensed with alkylene oxides include aromatic amines such as aniline, N-alkylphenylene-diamines, 2,4'-, 2,2'-, and 4,4'-methylenedianiline, 2,6- or 2,4-toluenediamine, vicinal toluenediamines, o-chloro-aniline, p-aminoaniline, 1,5-diaminonaphthalene, methylene dianiline, the various condensation products of aniline and formaldehyde, and the isomeric diaminotoluenes; and aliphatic amines such as mono-, di-, and trialkanolamines, ethylene diamine, propylene diamine, 2-hydroxy-propylamine, bis[2-hydroxyethyl]-2-hydroxypropylamine, diethylenetriamine, methylamine, triisopropanolamine, 1,3-diaminopropane, 1,3-diaminobutane, and 1,4-diaminobutane. Preferable amines include monoethanolamine, 2-hydroxypropylamine, bis[2-hydroxyethyl]-2]hydroxypropylamine, vicinal toluenediamines, ethylenediamines, and propylenediamine. The alkylene oxide may be reacted with all of the free amino hydrogens on at least one nitrogen atom to produce a tertiary amine polyol. Such polyols are disclosed in U.S. Pat. No. 5,073,576, incorporated herein by reference. It has also been found useful to mix the polyols initiated with polyhydric alcohols and polyols initiated with amines.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two -SH groups such as 1,2-ethanedithiol, 1,2-propanedithiol, 1,2-propanedithiol, and 1,6-hexanedithiol; alkene thiols such as 2-butene-1,4-dithiol; and alkyne thiols such as 3-hexyne-1,6-dithiol.

Also suitable as the polyol are polymer modified polyols, in particular, the so-called graft polyols. Graft polyols are well known to the art and are prepared by the in situ polymerization of one or more vinyl monomers, preferably acrylonitrile and styrene, in the presence of a polyether or polyester polyol, particularly polyols containing a minor amount of natural or induced unsaturation. Methods of preparing such graft polyols may be found in columns 1-5 and in the Examples of U.S. Pat. No. 3,652,639; in columns 1-6 and the Examples of U.S. Pat. No. 3,823,201; particularly in columns 2-8 and the Examples of U.S. Pat. No. 4,690,956; and in U.S. Pat. No. 4,524,157; all of which patents are herein incorporated by reference.

Non-graft polymer modified polyols are also preferred, for example, those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 μm, preferably less than 10 μm.

The blowing agent comprises water and preferably consists of water as the sole blowing agent. The amount of water present is effective to provide the desired density, preferably from 0.5 weight percent to 10 weight percent, more preferably from 4.5 weight percent to 8 weight percent, based on the weight of the polyol component. Formic acid may be admixed with the water as a co-blowing agent, in which case the amount of water to blow the foam is preferably from 0.1 weight percent to 5 weight percent, more preferably 0.7 weight percent to 3 weight percent. Using formic acid is advantageous for making a very fine-celled foam.

At the above-described quantities of water, one may manufacture a dimensionally stable, open-celled foam having a free rise density of from 0.9 pcf to 2.0 pcf or a dimensionally stable, closed-celled foam having an overall packed density of from 1.8 pcf to 6 pcf, preferably 1.9 pcf to 3 pcf, more preferably 1.9 pcf to 2.4 pcf.

The lithium salt used in the invention may include the lithium salt of a carboxylic acid having 2 to 24 substituted or unsubstituted, branched or unbranched, alkyl or alkenyl carbon atoms. The carbon atom count includes the carboxylic acid group atom. Preferred are those carboxylic acids having 2 to 6 carbon atoms since the lithium salt appears to more effectively open cells of a free rise and promote dimensional stability when using the lower numbered carbon atom carboxylic acids. Suitable carboxylic acids include acetic acid, propionic acid, butyric acid, pentanoic acid, mexanoic acid, stearic acid, oleic acid, lauric acid, benzoic acid, and salicylic acid, but preferred at the acids having 2 to 6 carbon atoms, most preferred being the lithium salt of acetic acid, lithium acetate.

The amount of lithium salt contained in the formulation is from 0.01 weight percent to about 5.0 weight percent, preferably 0.01 weight percent to about 3.0 weight percent, more preferably 0.2 weight percent to 2 weight percent, most preferably 0.5 weight percent to 1.0 weight percent, based on the weight of the polyol component. The amount necessary is that which will provide the desired open-celled content and dimensional stability. Although more than 5.0 weight percent may be employed, further improvements in foam stability are negligible.

Other optional ingredients in the polyol component include a catalyst, surfactant, flame retardant, and chain extender.

Suitable chain-extending agents, if used, include diethylene glycol, 1,4-butanediol and primary and secondary diamines such as phenylene diamine, 1,4-cyclohexane-bis-(methylamine), ethylenediamine, diethylenetriamine, N-(2-hydroxypropyl)ethylene-diamine, N,N'-di(2-hydroxypropyl)ethylenediamine, piperazine, and 2-methylpiperazine.

Any suitable urethane-promoting catalyst may be used including tertiary amines such as, for example, triethylenediamine, N-methylmorpholine, N-ethylmorpholine, diethylethanolamine, N-cocomorpholine, 1-methyl-4-dimethylamino-ethylpiperazine, 3-methoxypropyldimethylamine, N,N,N'-trimethyl-isopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408, incorporated herein by reference. A catalyst is not necessary in all cases as, for example, in the cases where the aforementioned compound having at least two isocyanate reactive hydrogens is autocatalytic.

A surface-active agent and/or stabilizer is recommended for production of high grade polyurethane foams. Numerous surface-active agents have been found satisfactory. Non-ionic surface active agents are preferred. Of these, the non-ionic surface-active agents such as the well-known silicones and an alpha-methyl styrene stabilizer have been found particularly desirable. Other surface-active agents which are operative, although not preferred, include polyethylene glycol ethers of long chain alcohols, tertiary aminé or alkanolamine salts of long chain alkyl acid sulfate esters, alkyl sulfonic esters, and alkyl arylsulfonic acids.

If desired, flame retardants may be incorporated in the foams. Among the flame retardants which may be employed are: pentabromodiphenyl oxide, dibromopropanol, tris(b-chloropropyl)-phosphate, 2,2-bis(-bromoethyl) 1,3-propanediol, tetrakis(2-chloroethyl)ethyl diphosphate, bis-(2-chloroethyl)2-chloroethylphosphonate, molybdenumtrioxide, ammonium molybdate, ammonium phosphate, pentabromodiphenyl oxide, tricresylphosphate, hexabromocyclododecane and dibromoethyl dibromocyclohexane. The concentrations of flame retardant compounds which may be employed range from 1 to 25 parts per 100 parts of polyol mixture.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, mixtures of 4,4'- and 2,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate, and 3.3'-dimethyldiphenylmethane-4,4'-diisocyanate; the triisocyanates such as 4,4',4"-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate, and mixtures thereof. Especially useful due to their availability and properties are 4,4'-diphenylmethane diisocyanate, polymethylene polyphenylene polyisocyanate, or mixtures thereof for rigid foams, or a mixture of the foregoing with toluene diisocyanates for semi-rigid foams.

Crude polyisocyanates may also be used in the compositions of the present invention, such as crude toluene diisocyanate obtained by the phosgenation of a mixture of toluenediamines or crude diphenylmethane isocyanate obtained by the phosgenation of crude diphenylmethane diamine. The preferred crude isocyanates are disclosed in U.S. Pat. No. 3,215,652.

Suitable methods of preparation include the prepolymer technique wherein an excess of organic polyisocyanate is reacted with a polyol to prepare a prepolymer having free isocyanate reactive groups, which is then reacted with a mixture of water, lithium salt and optional surfactants, and catalyst to obtain the foam. Alternatively, one may employ the quasi-prepolymer technique common in the preparation of rigid foams by reacting only a part of the polyol with the organic polyisocyanate to obtain a quasi-prepolymer, which is then reacted with the remaining portion of polyol in the presence of water, surfactant, and catalyst. Another option is to prepare a foam by reacting all the components in a single working step known as the "one-shot" method. In the one-shot method, the components may be mixed in a mix head or by impingement mixing.

The polyurethane components combined by any one of the above-mentioned techniques may be poured or sprayed into a cavity between the two substrates, allowing the components to fully foam and react. The foam-in-place techniques are well known in the art and employed herein.

The lithium salts of the invention should be pre-dissolved in water, formic acid, or the polyol depending on the solubility of the organic portion of the salt. Instead of pre-dissolving the lithium salt prior to metering, the lithium salt may be separately metered and added to the formulation as a solid. However, the salt must be milled to a fine dust as large granules fail to quickly dissolve in the formulation and fail to open up the cells of the foam. Regardless of which foaming method is employed, the prepolymer, one-shot, or quasi-prepolymer method, it is preferred to pre-dissolve the lithium salt in water as a solution which is added to the polyol component side or dissolved in formic acid as a solution which is added to the resin side.

The following Examples illustrate various embodiments of the invention and are not intended to limit the description of the invention:

Polyol A—is a polyol initiated with vicinal toluenediamines reacted with 30.2 weight percent ethylene oxide and terminated with 48.7 weight percent propylene oxide, having a molecular weight of 569, an average functionality of about 4, and a nominal hydroxyl number of about 390.

Polyol B—is a glycerine initiated polyol having a heteric 13.6 weight percent ethylene oxide-86.4 weight percent propylene oxide structure with a molecular weight of about 2867, an average functionality of about 2.9, and a nominal hydroxyl number of 56.

Polyol C—is a tertiary amine polyol initiated with monoethanolamine reacted with 55 weight percent propylene oxide and terminated with 26 weight percent ethylene oxide, having a molecular weight of 334, a functionality of about 3, and having a nominal OH number of about 500.

Polyol D—is a propylene oxide adduct of vicinal toluenediamines having a molecular weight of 494, an average functionality of about 4, and a nomimal OH number of 450

LUPRANATE ® M-20S is a polymethylene polyphenylene polyisocyanate having an NCO content of 31.8 weight percent, a viscosity of 200 cps at 25° C., and an average functionality of about 2.7, commercially available from BASF Corporation.

EXAMPLE

A polyol component masterbatch was prepared by mixing together 31.75 weight percent Polyol A; 18.14 weight percent Polyol B; 31.75 weight percent Polyol C; 9.07 weight percent Polyol D; 1.36 weight percent L-6900, a silicone surfactant commercially available from Union Carbide Corporation; 0.45 weight percent of dimethylcyclohexylamine Polycat 8 catalyst, commercially available from Air Products Corporation; 0.04 weight percent UL-28, a tin catalyst commercially available from Witco Corporation; 6.53 weight percent water; and 0.91 weight percent lithium acetate dissolved in the aforementioned water at about 100° F. for speedy dissolution.

The thoroughly mixed resin batch was stored in a tank kept at 79° F. connected to a high pressure PU-30 machine having an impingement mixhead. LUPRANATE ® M-20S was added to the second tank kept at 79° F. The isocyanate and resin were shot into a cavity a mix ratio of 0.52 resin/1.00 iso, a 110 index, at a pressure of 2500 psi on each component with a throughput of 0.68/b/second to yield the densities as stated below in the Table. The cavity into which the components were poured was a 48-quart polyethylene picnic cooler Model Number 1946 available from Rubbermaid Corporation whose surface had not been modified as by flame treatment or electrostatically discharged. Seven such picnic coolers were filled at the different overall densities.

After cure, 3"×3"×1" sections of the sides on the picnic cooler were cut out and subjected to thermal cycling to determine dimensional stability according to ASTM D-2126. Porosity, compressive strength, tumbling friability, and water absorption were measured according to ASTM D-2856 on a 1"×1"×1" sample, ASTM D-1621 on a 2"×2"×1" sample, ASTM C-421(12) on a 1"×1"×1" sample, and ASTM D-2842 on a 4"×4"×1" sample, respectively.

As can be seen by the results, the foams maintained good dimensional stability under hot, humid, and cold conditions indicating that the foams of the invention made with lithium acetate were dimensionally stable even at low overall densities.

TABLE 1

| | SAMPLE | | | | | | |
|---|---|---|---|---|---|---|---|
| | 1 | 2 | 3 | 4 | 5 | 6 | 7 |
| FILL WEIGHT (LB.) | 1.25 | 1.31 | 1.33 | 1.4 | 1.4 | 1.47 | 1.54 |
| CORE DENSITY (pcf) | 1.92 | 2 | 1.98 | 2.07 | 2.11 | 2.14 | 2.25 |
| OVERALL DENSITY (pcf) | 2.03 | 2.03 | 2.23 | 2.3 | 2.35 | 2.29 | 2.42 |
| COMPRESSIVE STRENGTH (psi) PERPENDICULAR | | | | | | | |
| STRENGTH-5% DEFLECTION | 8.9 | 8.9 | 8.1 | 5.9 | 8 | 8.9 | 10.3 |
| STRENGTH-10% DEFLECTION | 13.3 | 12.8 | 14.1 | 10.8 | 11.9 | 15.4 | 17 |
| MODULUS | 209 | 199 | 163 | 118 | 176 | 183 | 221 |
| TUMBLING FRIABILITY, % WEIGHT LOSS | 1.58 | 1.81 | 1.93 | 1.56 | 1.91 | 1.76 | 1.38 |
| POROSITY (% CLOSED CELLS) | | | | | | | |
| CORRECTED | 92.67 | 88.83 | 97.58 | 99.04 | 101.91 | 92.62 | 96.81 |

TABLE 1-continued

| | SAMPLE | | | | | | |
|---|---|---|---|---|---|---|---|
| | 1 | 2 | 3 | 4 | 5 | 6 | 7 |
| UNCORRECTED WATER ABSORPTION, | 80.31 | 73.05 | 85.94 | 87.55 | 85.97 | 83.55 | 87.21 |
| LBS/FT2 | 0.041 | 0.033 | 0.036 | 0.055 | 0.1 | 0.036 | 0.04 |
| LBS/FT3 | 1.511 | 1.192 | 1.275 | 1.996 | 3.66 | 1.28 | 1.448 |
| PERCENT | 2.421 | 1.91 | 2.044 | 3.199 | 5.865 | 2.051 | 2.32 |
| SIMULATED SERVICE CONDITIONS, 100 F. & 100% R.H. | | | | | | | |
| % VOL. CHANGE AFTER 1 DAY | −4.3 | −4.6 | −2.6 | 2.3 | −0.3 | −0.5 | −1.4 |
| % VOL. CHANGE AFTER 2 DAYS | −3.7 | −4.1 | −2.7 | 1.2 | −1 | −0.8 | −0.5 |
| % VOL. CHANGE AFTER 7 DAYS | −8.5 | −8.6 | −3.2 | −4 | −0.3 | −2.8 | −7.3 |
| % VOL. CHANGE AFTER 14 DAYS | −11.7 | −7.3 | −2.5 | −3.9 | −0.7 | −6.3 | −5.6 |
| % VOL. CHANGE AFTER 28 DAYS | −12.5 | −9.1 | −3.4 | −3.8 | −2.6 | −6.5 | −8.2 |
| 158 F. | | | | | | | |
| % VOL. CHANGE AFTER 1 DAY | −1.9 | −7.8 | −3.6 | −3.5 | −2.9 | −7 | −3 |
| % VOL. CHANGE AFTER 2 DAYS | −1 | −10.2 | −7.5 | −3.6 | −2.3 | −9.3 | −1.9 |
| % VOL. CHANGE AFTER 7 DAYS | −0.4 | −9.1 | −5.1 | −3.9 | −5.1 | −8.7 | −3.2 |
| % VOL. CHANGE AFTER 14 DAYS | 0.1 | 2 | −4.3 | −2.1 | −4.4 | −6.1 | −1.3 |
| % VOL. CHANGE AFTER 28 DAYS | −0.1 | −4.7 | −3.9 | −2.3 | −2.8 | −7.1 | −1.7 |
| −20 F. | | | | | | | |
| % VOL. CHANGE AFTER 1 DAY | −0.8 | −0.1 | −0.2 | −0.6 | −1.3 | −1.4 | −0.8 |
| % VOL. CHANGE AFTER 2 DAYS | −0.6 | 0.6 | 0 | −0.1 | −1 | −0.5 | 0.4 |
| % VOL. CHANGE AFTER 7 DAYS | −1.4 | 1.7 | 0.1 | 1.6 | 0 | 1.4 | 1 |
| % VOL. CHANGE AFTER 14 DAYS | −0.5 | 2.4 | 0.1 | 2.3 | 0.6 | 2.9 | 1.9 |

What we claim is:

1. A composite comprising in sequential order a first substrate, a water-blown polyurethane foam, and a second substrate, wherein the polyurethane foam comprises the reaction product of an aromatic polyisocyanate with a polyol component comprising:
   A. compounds having at least two isocyanate reactive hydrogens with an average molecular weight of at least 150 and an average functionality of at least 2.5,
   B. a blowing agent comprising water, and
   C. a lithium salt of a carboxylic acid having from 2 to 24 substituted or unsubstituted, branched or unbranched, aliphatic or cycloaliphatic, alkyl or alkenyl carbon atoms.

2. The composite of claim 1, wherein the polyurethane foam has a packed overall density of 1.9 pcf to 2.4 pcf.

3. The composite of claim 1, wherein the first substrate and/or the second substrate are each made of a polymer selected from the group consisting of high impact polystyrene, acrylonitrile-butadiene-styrene, copolymers of ethylene and vinyl acetate, copolymers of ethylene and vinyl alcohol, copolymers of ethylene and acrylic acid, polyethylene, polypropylene, low density polyethylene, linear low density polyethylene, high density polyethylene, high molecular weight high density polyethylene, polyvinyl chloride, nylon 66, amorphous thermoplastic polyesters, styrene-butadiene, styrene-ethylene/butylene-styrene, polyethylene terephthalate, polycarbonate, polyacetals, wood, and metal.

4. The composite of claim 3, wherein the first substrate and/or the second substrate are comprised of metal selected from the group consisting of aluminum and steel, polyethylene, polypropylene, acrylonitrile-butadiene-styrene, and high impact polystyrene.

5. The composite of claim 4, wherein the composite is a cooling container.

6. The composite of claim 1, wherein the foam has from 4 weight percent to 8 weight percent water as the blowing agent based upon the weight of the polyol component.

7. The composite of claim 1, wherein the polyurethane foam is dimensionally stable having less than 15 percent volume change at 100° F. and 100 percent relative humidity after 28 days and has less than 3 percent volume change at −20° F. after 14 days.

8. The composite of claim 7, wherein the polyurethane foam is overpacked between the first substrate and the second substrate by an amount from 5 percent to 10 percent.

9. The composite of claim 1, wherein the amount of lithium salt is from 0.5 weight percent to 1.0 weight percent, based on the weight of the polyol component.

10. A composite comprising in sequential order a first substrate, a polyurethane foam, and a second substrate, wherein the polyurethane foam is blown with a blowing agent consisting essentially of water and is dimensionally stable having 20 percent change in volume or less at 100° F. and 100 percent relative humidity after 28 days and 5 percent change in volume or less at −20° F. after 14 days, wherein the foam and said second substrate by an amount of 5 percent to 10 percent.

11. The composite of claim 10, wherein the blowing agent consists of water.

12. The composite of claim 10, wherein the first substrate and/or the second substrate comprise polyethylene, aluminum, steel, polypropylene, acrylonitrile-butadiene-styrene, or high impact polystyrene.

13. The composite of claim 10, wherein the foam has a packed overall density of 1.9 pcf to about 2.4 pcf.

14. The composite of claim 10, wherein the foam has 10 percent change in volume or less at 100° F. and 100 percent relative humidity after 28 days and 3 percent change in volume or less at −20° F. after 14 days.

15. A method of making a composite comprising foaming in place a polyurethane foam into a cavity defined by a first substrate and a second substrate held apart in a spaced relationship, wherein the polyurethane foam is obtained by reacting an aromatic polyisocyanate with a polyol component;
   A. compounds having at least two isocyanate reactive hydrogens with an average molecular weight of at least 150 and an average functionality of at least 2.5,
   B. a blowing agent comprising water, and C. a lithium salt of a carboxylic acid having from 2 to 24 substituted or unsubstituted, branched or unbranched, aliphatic or cycloaliphatic, alkyl or alkenyl carbon atoms.

16. The method of claim 15, wherein the amount of polyurethane foam in the cavity is 5 percent to 10 percent more than the minimum amount needed to fill the cavity.

17. The method of claim 15, wherein the polyurethane foam has a packed overall density of 1.9 pcf to about 2.4 pcf.

18. The composite of claim 15, wherein the first substrate and/or the second substrate are each made of a polymer selected from the group consisting of high impact polystyrene, acrylonitrile-butadiene-styrene, copolymers of ethylene and vinyl acetate, copolymers of ethylene and vinyl alcohol, copolymers of ethylene and acrylic acid, polyethylene, polypropylene, low density polyethylene, linear low density polyethylene, high density polyethylene, high molecular weight high density polyethylene, polyvinyl chloride, nylon 66, amorphous thermoplastic polyesters, styrene-butadiene, styrene-ethylene/butylene-styrene, polyethylene terephthalate, polycarbonate, polyacetals, wood, and metal.

19. The composite of claim 18, wherein the first substrate and/or the second substrate are comprised of metal selected from the group consisting of aluminum and steel, polyethylene, polypropylene, acrylonitrile-butadiene-styrene, and high impact polystyrene.

20. The method of claim 19, wherein the composite is a cooling container.

* * * * *

UNITED STATES PATENT AND TRADEMARK OFFICE
CERTIFICATE OF CORRECTION

PATENT NO. : 5,262,447
DATED : November 16, 1993
INVENTOR(S) : Tucker, John R.

It is certified that error appears in the above-indentified patent and that said Letters Patent is hereby corrected as shown below:

In column 12, line 44, delete "and said second substrate" and substitute therefor, --is overpacked--.

Signed and Sealed this

Twenty-sixth Day of April, 1994

Attest:

BRUCE LEHMAN

Attesting Officer     Commissioner of Patents and Trademarks